(12) United States Patent
Kirubaharan et al.

(10) Patent No.: US 9,056,563 B2
(45) Date of Patent: Jun. 16, 2015

(54) ADJUSTMENT MEANS FOR A VEHICLE SEAT

(75) Inventors: Albert Reginold Kirubaharan, Burscheid (DE); Andrej Medved, Trencin (SK); Eduard Meres, Omšenie (SK)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 14/004,380

(22) PCT Filed: Mar. 8, 2012

(86) PCT No.: PCT/EP2012/001032
§ 371 (c)(1),
(2), (4) Date: Nov. 18, 2013

(87) PCT Pub. No.: WO2012/123084
PCT Pub. Date: Sep. 20, 2012

(65) Prior Publication Data
US 2014/0203612 A1    Jul. 24, 2014

(30) Foreign Application Priority Data
Mar. 11, 2011 (DE) .......................... 10 2011 013 723

(51) Int. Cl.
*B60N 2/22* (2006.01)
*B60N 2/20* (2006.01)
*B60N 2/225* (2006.01)

(52) U.S. Cl.
CPC .. *B60N 2/22* (2013.01); *B60N 2/20* (2013.01); *B60N 2/206* (2013.01); *B60N 2/2252* (2013.01)

(58) Field of Classification Search
CPC ....................................................... B60N 2/22
USPC ................. 297/354.12, 378.1, 378.12, 463.1, 297/463.2
See application file for complete search history.

(56) References Cited

U.S. PATENT DOCUMENTS

| 4,335,919 | A | * | 6/1982 | Nagashima et al. .......... 297/362 |
| 4,732,425 | A | * | 3/1988 | Terada et al. ................. 297/362 |
| 5,588,705 | A | * | 12/1996 | Chang ........................ 297/367 R |
| 6,619,743 | B1 | | 9/2003 | Scholz et al. |
| 6,749,262 | B2 | * | 6/2004 | Schaffner et al. ......... 297/367 R |
| 8,109,573 | B2 | * | 2/2012 | Kienke et al. ............. 297/367 R |
| 2006/0055219 | A1 | * | 3/2006 | Heimann et al. ............. 297/276 |
| 2010/0072802 | A1 | | 3/2010 | Smith et al. |
| 2011/0043021 | A1 | * | 2/2011 | Chen ........................ 297/354.12 |
| 2011/0133534 | A1 | * | 6/2011 | Ngiau ....................... 297/354.12 |

FOREIGN PATENT DOCUMENTS

| JP | 2000-102440 | 4/2000 |
| JP | 2009-045082 | 3/2009 |

OTHER PUBLICATIONS

International Preliminary Report on Patentability mailed Sep. 26, 2013, as received in corresponding International Patent Application No. PCT/EP2012/001032.
International Search Report dated Aug. 31, 2012 as received in International Application No. PCT/EP2012/001032.
Office Action dated Oct. 15, 2014 in corresponding Japanese application No. 2013-557007, 4 pages.

* cited by examiner

*Primary Examiner* — Peter Brown
(74) *Attorney, Agent, or Firm* — Foley & Lardner LLP

(57) ABSTRACT

An adjustment device for a vehicle seat, by which the inclination angle of the backrest of the vehicle seat can be adjusted relative to the seating part, has an adjustment range that is adjustable by removable stops.

9 Claims, 2 Drawing Sheets

ADJUSTMENT MEANS FOR A VEHICLE SEAT

CROSS REFERENCE TO RELATED APPLICATIONS

The present application is a U.S. National Stage of International Application No. PCT/EP2012/001032 filed on Mar. 8, 2012, which claims the benefit of German Patent Application No. 10 2011 013 723.8 filed on Mar. 11, 2011, the entire disclosures of all of which are incorporated herein by reference.

The present invention relates to an adjustment means for a vehicle seat having a seat part and a backrest, which alters the angle of inclination of the backrest relative to the seat part and which has a seat part fitting which is connected to the seat part and a backrest fitting which is connected to the backrest, wherein stops are provided on the fittings which limit the adjustment range of the backrest relative to the seat part.

Such adjustment means are known from the prior art. Said adjustment means are arranged between a seat part and a backrest, resulting in the backrest being able to be rotated relative to the seat part, for example for the purposes of comfort and/or easy entry. In theory, said adjustment means have an adjustment range of 360° which, however, typically has to be limited by conditions inside the vehicle. Often, therefore, it is expedient to select the adjustment range of the seats in the first row to be different from the seats in a row behind. Moreover, the forward adjustment range of each backrest is often intended to be different from the rearward adjustment range.

It was, therefore, the object of the present invention to provide an adjustment means which is able to be adapted to the respectively desired adjustment range in a simple manner.

The object is achieved by an adjustment means of a vehicle seat having a seat part and a backrest, said adjustment means altering the angle of inclination of a backrest relative to a seat part and having a seat part fitting which is connected to the seat part and a backrest fitting which is connected to the backrest, wherein stops are provided on the fittings which limit the adjustment range of the backrest relative to the seat part and wherein the adjustment range is provided to be adjustable.

The present invention relates to an adjustment means, for example a recliner, in particular a tumbling recliner by which the inclination of the backrest may be adjusted relative to a seat part. Generally, the adjustment means has a first fitting which is connected to the backrest, for example to a side part of the backrest, and a second fitting which is connected to the seat part. The person skilled in the art recognizes that at least one of the fittings may also be part of the backrest frame and/or seat part frame.

Embodiments relating to this subject of the present invention apply equally to the other subjects of the present invention and vice versa.

According to the invention, at least one stop is provided on one or both fittings, said stop preventing the backrest from being adjusted beyond a desired adjustment range. According to the invention, this adjustment range is now provided to be adjustable. As a result, the adjustment range may be retrospectively altered and/or the adjustment range may be adapted to the respective vehicle seat. For example, a vehicle seat may be provided for a plurality of vehicle types, wherein the adjustment range of the different types of vehicle may be at least partially variable and/or the vehicle seats for the first seat row and the seat rows behind may be of identical construction but provided with different adjustment ranges.

According to a further subject or a preferred subject of the present invention, at least one stop but preferably both stops is/are provided to be able to be dismantled, so that the stops may be substituted and/or altered in the position thereof, in order to alter the adjustment range of the backrest.

Embodiments which relate to this subject of the present invention apply equally to the other subjects of the present invention and vice versa.

Preferably, the stop is attached by a bolt to the fitting.

According to a further subject or a preferred subject of the present invention, at least one stop has a first stop surface and a second stop surface. Said stop surfaces may optionally be brought into engagement with the stop which is provided on the other fitting. As a result, the desired adjustment range may be altered.

Embodiments which relate to this subject of the present invention apply equally to the other subjects of the present invention and vice versa.

According to a further subject or a preferred subject of the present invention, at least one stop has two different limiting regions. Said different limiting regions may optionally be brought into engagement with the stop which is provided on the other fitting. As a result, the desired adjustment range may be altered.

Embodiments which relate to this subject of the present invention apply equally to the other subjects of the present invention and vice versa.

The following embodiments apply equally to all subjects of the present invention.

Preferably, the stop is arranged on the fitting by a fastening means, in particular by a bolt.

According to a preferred embodiment, the stop is arranged on the fitting so as to be non-rotatable.

Preferably, a projection is provided on the fitting, said projection cooperating with a depression and/or recess on the stop as an anti-rotation stop.

A further subject of the present invention is a method for adjusting the adjustment range of an adjustment means, in particular the above-described inventive or preferred adjustment means, in which one stop is replaced by a different stop or the same stop is mounted in a different position in order to alter the adjustment range of an adjustment means of a vehicle seat.

Embodiments which relate to this subject of the present invention apply equally to the other subjects of the present invention and vice versa.

Preferably the stop is dismantled, rotated by 180° and remounted.

Preferably, said stop is mounted in a reversible manner on the backrest fitting of the adjustment means.

The invention is described hereinafter with reference to FIGS. 1 to 7. Said descriptions are provided merely by way of example and do not limit the general inventive idea.

Figures 1, 2:
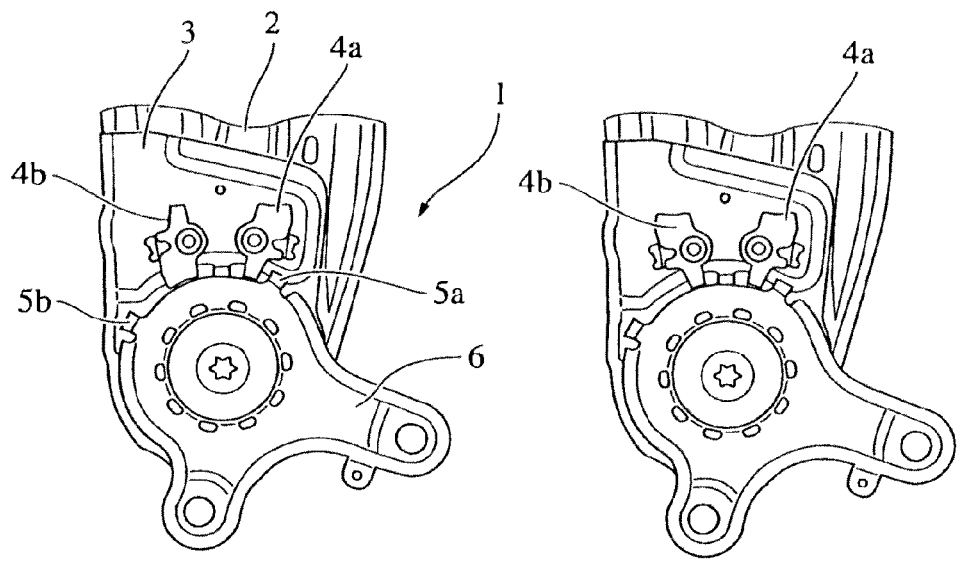
FIG. 1 shows the adjustment means according to the invention with a first adjustment range.
FIG. 2 shows the adjustment means according to FIG. 1 with a different adjustment range.

FIG. 1 shows the adjustment means 1 according to the invention, in this case a so-called recliner. Said recliner comprises a backrest fitting 3 which is connected to a side part 2 of the backrest. Said backrest fitting 3 is provided so as to be rotatable on a seat part fitting 6. Said seat part fitting has two stops 5a, 5b which limit the rotational movement of the backrest fitting and thus the backrest and preferably are provided integrally with the seat part fitting. Said stops 5a, 5b cooperate in each case with a stop 4a, 4b so that the angle of adjustment of the backrest is limited. In the arrangement according to FIG. 1, the limiting regions of the stops 4a, 4b for the forward and rearward rotation are provided to be variable, which is described in more detail with reference to FIG. 6. The stops 4a, 4b are in each case arranged on the backrest fitting in a manner in which they are able to be dismantled, in this case fastened by means of bolts.

FIG. 2 substantially shows the adjustment means according to FIG. 1, but in the present case the stops 4a, 4b limit the forward and/or rearward movement to the same degree, in this case respectively 10°, which is described in more detail with reference to FIG. 5.

Figure 3:
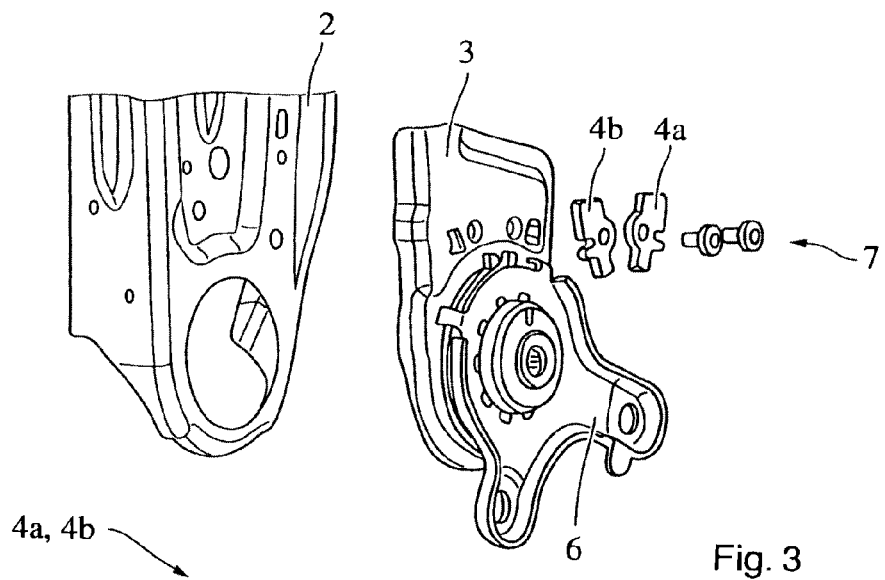
FIG. 3 shows an exploded view of the adjustment means according to FIGS. 1 and 2.

FIG. 3 shows an exploded view of the adjustment means according to FIG. 2. It is clearly visible that the stops 4a, 4b are arranged on the backrest fitting 3 by means of bolts, said backrest fitting being arranged in turn on the backrest side part 2, in particular by a material connection. The fittings 3, 6 are connected together by means of the rotating mechanism (not shown) of the adjustment means.

Figure 4:
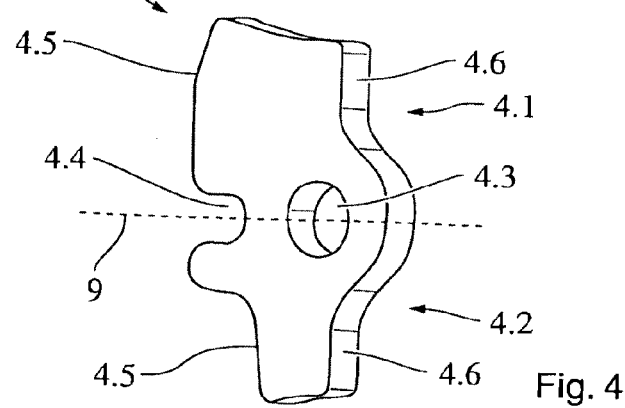
FIG. 4 shows the stop.

FIG. 4 shows details of the stop 4a, 4b. Said stop has a recess 4.3 which is penetrated by the fastening means 7, for example the bolt 7, and by means of which the stop 4a, 4b may be fastened to the backrest fitting 3. In order to prevent the stop 4a, 4b from rotating under load, said stop has an anti-rotation stop 4.4, in this case a recess into which, for example, a tab which is formed out of the backrest fitting engages. The stop 4a, 4b has two limiting regions, namely a 20° limiting region 4.1 and a 10° limiting region 4.2. The limiting region 4.1 reduces the angle of rotation of the backrest fitting by 20°, the limiting region 4.2 reduces the backrest rotation by 10°. In both regions 4.1, 4.2 a first stop 4.5 is provided in each case, the stop 5a, 5b bearing against said stop and as a result limiting the rotation/adjustment of the backrest. By rotating the stop 4a, 4b about the rotational axis 9, the respectively desired limiting region may be brought into engagement with the stop 5a, 5b. As a result, by means of one component 4a, 4b, two different adjustment ranges may be set if required. The person skilled in the art understands that the stops may also be rotated about a vertical axis, in order to alter the respective adjustment range. Potentially the anti-rotation stop would then have to be provided in a different manner. Thus different adjustment ranges are able to be implemented and/or the adjustment range may be altered by one adjustment means in a very simple manner. The person skilled in the art understands that, by means of the stops, a total of four different adjustment options/adjustment ranges are provided, i.e. two different adjustment options for the rotation oriented to the front of the backrest and two adjustment options for the rotation oriented to the rear of the backrest. Both stops 4a, 4b are preferably of identical construction which reduces the production costs thereof. Preferably, in each case the stop 4 in both regions 4.1, 4.2 has a second stop 4.6. The second stop 4.6 may, for example, be supported on the radial lugs 11a, 11b (see FIG. 5) which are preferably provided in a fixed manner. As a result, in particular the loading of the fastening means 7 and optionally of the anti-rotation stop 4.4, 8 is reduced.

Figure 5:
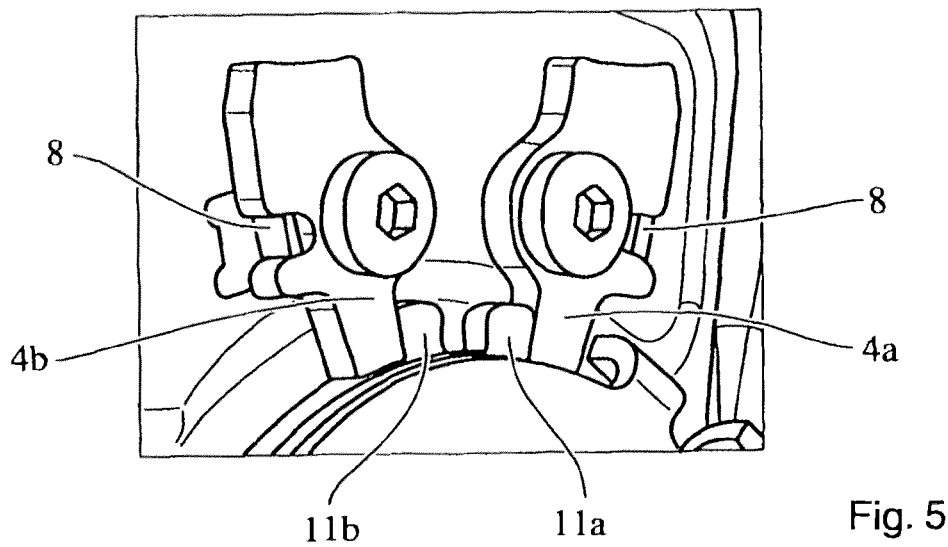
FIG. 5 shows two stops with a first adjustment range.

FIG. 5 shows the limiting situation according to FIG. 2. In the present case, the stop 4 is in each case mounted so that both the forward and the rearward rotation is limited by 10°, wherein the stop 4b is responsible for limiting the rearward rotation of the backrest and the stop 4a for limiting the forward rotation of the backrest.

Figure 6:
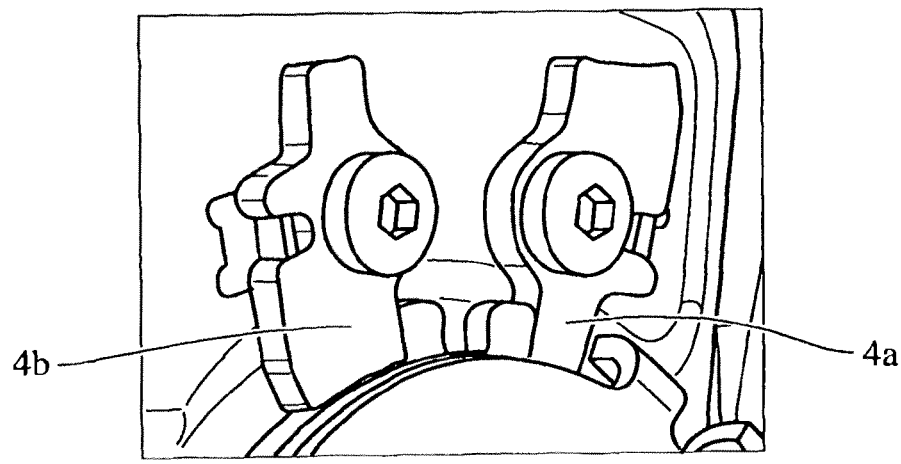
FIG. 6 shows two stops with a second adjustment range.

FIG. 6 substantially shows the arrangement according to FIG. 5, wherein in the present case the stop 4b has been rotated about its axis 9, so that now the limiting region 20° cooperates with the stop 5b, i.e. in the present case the rearward rotation of the backrest is limited to a greater extent than the forward rotation thereof.

Figure 7:
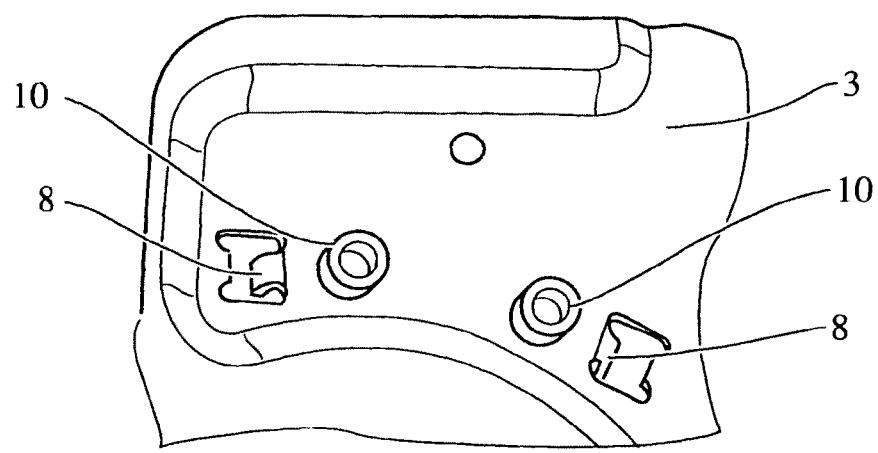
FIG. 7 shows details of the backrest fitting.

FIG. 7 shows a detail of the backrest fitting 3. Said backrest fitting has two recesses and/or shaped portions 10 into which the bolt is inserted, preferably screwed in, and as a result the fitting 4a, 4b is fastened to the backrest fitting in a manner in which it is able to be dismantled. The backrest fitting comprises tabs 8 through a recess, said tabs in each case engaging in the recess 4.4 of a fitting 4 and, as a result, preventing the fitting from twisting inadvertently in the mounted state.

By means of a spring means which preferably cooperates with both stops 4, the respective stop 4 may be held in engagement with the tab 8 and/or noise development may be prevented.

LIST OF REFERENCE NUMERALS

1 Adjustment means, recliner
2 Backrest side part
3 Backrest fitting
4a, 4b Stop
4.1 Limiting region, 20° limit
4.2 Limiting region, 10° limit
4.3 Recess
4.4 Anti-rotation stop, depression, recess
4.5 First stop surface
4.6 Second stop surface
5a, 5b Stop on the seat part fitting
6 Seat part fitting
7 Fastening means, bolt
8 Recess, projection, anti-rotation stop
9 Rotational axis
10 Thread
11a Support, supporting tab
11b Support, supporting tab

The invention claimed is:

1. An adjustment device for a vehicle seat, having a seat part and a backrest, which alters the angle of inclination of a backrest relative to a seat part, the adjustment device comprising:
   a seat part fitting which is configured to be connected to the seat part; and
   a backrest fitting which is configured to be connected to the backrest, and
   wherein the seat part fitting and the backrest fitting comprise stops configured to limit an adjustment range of the backrest relative to the seat part, wherein the stops define an extent of the adjustment range,
   wherein at least one stop is configured to be removable, rotatable by 180°, and remountable so as to adjust the extent of the adjustment range.

2. The adjustment device as claimed in claim 1, wherein at least one stop is configured to be removable from one of the seating part fitting and the backrest fitting.

3. The adjustment device as claimed in claim 1, wherein at least one stop has a first stop surface and a second stop surface along different areas of the at least one stop.

4. The adjustment device as claimed in claim 1, wherein at least one stop is mountable in two positions, wherein the adjustment range is different in the two positions.

5. The adjustment device as claimed in claim 1, wherein at least one stop is arranged on one of the seat part fitting and the backrest fitting by a fastening member.

6. The adjustment device as claimed in claim 1, wherein at least one stop is arranged on one of the seat part fitting and the backrest fitting so as to be non-rotatable.

7. The adjustment device as claimed in claim 6, wherein a projection is provided on the one of the seat part fitting and the backrest fitting with the at least one stop, said projection cooperating with an anti-rotation stop on the stop, wherein the anti-rotation stop is at least one of a depression and a recess.

8. A method for adjusting the adjustment range of an adjustment device as claimed in claim 1, the method comprising replacing one stop by a different stop or mounting the stop in a different position from an original position, wherein the different stop and the different position each define a different extent of the adjustment range than the one stop and the original position, respectively.

9. A method for adjusting the adjustment range of an adjustment device for a vehicle seat, having a seat part and a backrest, which alters the angle of inclination of a backrest relative to a seat part, the adjustment device comprising:
    a seat part fitting which is configured to be connected to the seat part; and
    a backrest fitting which is configured to be connected to the backrest, and
    wherein the seat part fitting and the backrest fitting comprise stops configured to limit an adjustment range of the backrest relative to the seat part, wherein the stops define an extent of the adjustment range, the method comprising:
mounting the stop in a different position from an original position, wherein the different position defines a different extent of the adjustment range than the original position, wherein mounting the stop in the different position comprises removing the stop, rotating the stop by 180°, and remounting the stop.

* * * * *